US010902631B2

(12) United States Patent
Citerin et al.

(10) Patent No.: US 10,902,631 B2
(45) Date of Patent: Jan. 26, 2021

(54) METHOD AND SYSTEM FOR IMPROVING CONSTRUCTION OF REGIONS OF INTEREST

(71) Applicant: CANON KABUSHIKI KAISHA, Tokyo (JP)

(72) Inventors: Johann Citerin, Betton (FR); Pierre Visa, Rennes (FR); Falk Tannhauser, Rennes (FR); Gérald Kergourlay, Chevaigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 87 days.

(21) Appl. No.: 16/249,179

(22) Filed: Jan. 16, 2019

(65) Prior Publication Data
US 2019/0228540 A1 Jul. 25, 2019

(30) Foreign Application Priority Data

Jan. 23, 2018 (GB) .................................. 1801111.4
Sep. 11, 2018 (GB) .................................. 1814723.1

(51) Int. Cl.
*G06K 9/00* (2006.01)
*G06T 7/73* (2017.01)
(Continued)

(52) U.S. Cl.
CPC .................. *G06T 7/73* (2017.01); *G06T 7/11* (2017.01); *G06T 7/215* (2017.01);
(Continued)

(58) Field of Classification Search
CPC ... G06T 7/73; G06T 7/215; G06T 7/11; G06T 2207/30232; H04N 7/18; H04N 7/181;
(Continued)

(56) References Cited

U.S. PATENT DOCUMENTS 8,274,530 B2 * 9/2012 Birtwistle ............. G06T 11/001
345/581
2005/0246328 A1 * 11/2005 Zhang ................. G06F 16/9535
(Continued)

FOREIGN PATENT DOCUMENTS

EP    1591923 A1 *  11/2005  ......... G06F 16/9535
EP    1591923 A1     11/2005
(Continued)

*Primary Examiner* — Mahendra R Patel
(74) *Attorney, Agent, or Firm* — Canon U.S.A., Inc. IP Division (57) ABSTRACT

A method for constructing a region of interest from images representing a same scene, the region of interest being used for setting the camera used to obtain the images and/or to process images obtained from the camera, the method including obtaining a plurality of images representing a same scene; detecting predetermined targets in images of the plurality of images; segmenting an area corresponding to the images of the plurality of images into portions of image, each of the portions being associated with a relevance indication for the corresponding portion to be selected as part of a region of interest; selecting at least one relevant portion among the portions, as a function of the relevance indications; upon detecting selection of a relevant portion, updating the relevance indication associated with relevant portions different than the selected relevant portions, as a function of the selected relevant portions; and constructing a region of interest based on the selected relevant portions.

19 Claims, 7 Drawing Sheets (51) Int. Cl.
*G06T 7/11* (2017.01)
*G08B 13/196* (2006.01)
*G06T 7/215* (2017.01)
*H04N 7/18* (2006.01)

(52) U.S. Cl.
CPC ......... *G08B 13/19682* (2013.01); *H04N 7/18* (2013.01); *G06K 9/00771* (2013.01); *G06T 2207/30232* (2013.01)

(58) Field of Classification Search
CPC ............. H04N 5/2254; H04N 5/23296; H04N 5/23216; G06K 9/00771; G06K 9/00342; G06K 9/00221; G06K 9/00; G06K 9/0061; G06K 9/0021; G08B 13/19682; G06F 16/9535; A61B 6/467; A61B 6/5211
USPC ............................................ 382/103; 348/159
See application file for complete search history.

(56) References Cited

U.S. PATENT DOCUMENTS

| | | | | |
|---|---|---|---|---|
| 2008/0181486 A1* | 7/2008 | Spooner | ............... | G06T 7/55 382/154 |
| 2008/0292193 A1* | 11/2008 | Bigioi | ............... | G03B 19/02 382/203 |
| 2008/0317339 A1* | 12/2008 | Steinberg | ............... | G06T 5/50 382/167 |
| 2010/0094878 A1* | 4/2010 | Soroca | ............... | G06Q 30/02 707/748 |
| 2014/0198979 A1* | 7/2014 | Hamarneh | ............... | G06T 7/11 382/154 |
| 2015/0055824 A1* | 2/2015 | Hong | ............... | G06K 9/4652 382/103 |
| 2015/0146029 A1* | 5/2015 | Venkataraman | ..... | H04N 5/2258 348/218.1 |
| 2016/0142680 A1* | 5/2016 | Tsunematsu | ........... | H04N 7/181 348/159 |
| 2016/0381301 A1* | 12/2016 | Shroff | ............... | G06T 11/60 348/240.3 |
| 2018/0025003 A1* | 1/2018 | Marriott | ............... | G06F 16/55 707/740 |

FOREIGN PATENT DOCUMENTS

| | | | | |
|---|---|---|---|---|
| EP | 3024227 A1 | 5/2016 | | |
| WO | 2007/094802 A2 | 8/2007 | | |
| WO | 2013/040673 A1 | 3/2013 | | |
| WO | WO-2013040673 A1 * | 3/2013 | ............ | G06T 7/174 |
| WO | 2014/155243 A1 | 10/2014 | | |

\* cited by examiner

METHOD AND SYSTEM FOR IMPROVING CONSTRUCTION OF REGIONS OF INTEREST

CROSS REFERENCE TO RELATED APPLICATIONS

This application claims the benefit under 35 U.S.C. § 119(a)-(d) of United Kingdom Patent Application No. 1801111.4, filed on Jan. 23, 2018, and of United Kingdom Patent Application No. 1814723.1, filed on Sep. 11, 2018, both entitled "Method and system for improving construction of regions of interest". The above cited patent applications are incorporated herein by reference in their entirety.

FIELD OF THE INVENTION

The present invention relates to the technical field of image processing and camera setting and to a method and a system for improving construction of regions of interest.

BACKGROUND OF THE INVENTION

Video surveillance is currently a fast-growing market tending to become increasingly widespread for ubiquitous applications. It can be used today in numerous areas such as crime prevention, private and public areas for security purposes, abnormal event detection, traffic monitoring, customer behaviour surveillance, or general data gathering.

The ever-increasing use of network cameras for such purposes has led in particular to increased image quality, especially to improved image resolution, contrast, and colour.

As a consequence, the storage space that is required to store images acquired via the network cameras is increasing dramatically, which leads to increases in the costs of the video surveillance system and the costs for retrieving a video sequence when images related to an event are to be analysed.

To cope with such drawbacks, there exist solutions consisting in analysing all the images before they are stored so as to identify the ones that should be actually stored. For example, identifying motion in images makes it possible to identify which images are different and thus, which images should be recorded. Accordingly, the amount of data to be stored may be significantly reduced when nothing happens. However, despite a theoretical efficiency, such solutions are not so efficient in practice due to the resources that are needed for analysing the images and due to the fact that in most situations, there are always small movements related, for example, to cloud motion or to small tree movements.

To cope with this phenomenon, a user may define a region of interest in the field of view of a camera, that is to say in images captured by this camera, in view of the tasks to be performed. Such a region of interest may be used to monitor motion so as to determine whether or not an image is to be stored. Moreover, it can be used to identify a part of the images that is to be used as a reference part for setting the camera, for example for controlling exposure or focus. Moreover, when the considered application requires some Video Content Analytics (VCA) to be used (like license plate recognition or face recognition), the region of interest may also be used to identify which parts of an image should be analysed by the VCA, so as to save some processing power that would be wasted on analysing the rest of the image.

However, while the use of regions of interest makes it possible to determine more accurately which images are to be stored and to improve settings of the camera in view of tasks to be performed, as well as reducing the VCA processing load, determining a region of interest is often problematic. In particular, for practical reasons the regions of interest generally have a predetermined arbitrary shape which typically corresponds to a basic geometrical figure such as a rectangle or a circle, that is not adapted to the actual configuration. Moreover, in most circumstances, a user defines a region of interest by viewing only to one or a few images, that is to say without a real knowledge of the scene.

Therefore, the use of regions of interest is not as efficient as it should be.

Consequently, there is a need to improve construction of regions of interest in images.

SUMMARY OF THE INVENTION

The present invention has been devised to address one or more of the foregoing concerns.

In this context, there is provided a solution for constructing a region of interest comprising one or more image portions that may be selected by a user, these portions being identified as a function of image analysis, selecting a portion potentially having an impact on guiding the selection of other portions depending on the actual scene from which the images are captured and on the tasks to be performed when processing these images.

According to a first aspect of the invention, there is provided a method for constructing a region of interest from images representing a same scene, the region of interest being used for setting the camera used to obtain the images and/or to process images obtained from the camera, the method comprising:

obtaining a plurality of images representing a same scene;

detecting predetermined targets in images of the plurality of images;

in response to detecting predetermined targets, segmenting an area corresponding to the images of the plurality of images into portions of image, each of the portions being associated with a relevance indication for the corresponding portion to be selected as part of a region of interest;

selecting at least one relevant portion among the portions, as a function of the relevance indications;

upon detecting selection of a relevant portion, updating the relevance indication associated with relevant portions different than the selected relevant portions, as a function of the selected relevant portions; and constructing a region of interest based on the selected relevant portions.

According to the method of the invention, optimum areas for regions of interest may be automatically determined or suggested to a user, these areas being of any shape, while selecting a particular area may affect relevance of selecting other areas, for example in view of light conditions or depth of field.

Optional features of the invention are further defined in the dependent appended claims.

According to a second aspect of the invention, there is provided a device for constructing a region of interest from images representing a same scene, the region of interest being used for setting the camera used to obtain the images and/or to process images obtained from the camera, the device comprising a microprocessor configured for carrying out the steps of:

obtaining a plurality of images representing a same scene;

detecting predetermined targets in images of the plurality of images;

in response to detecting predetermined targets, segmenting an area corresponding to the images of the plurality of images into portions of image, each of the portions being associated with a relevance indication for the corresponding portion to be selected as part of a region of interest;

selecting at least one relevant portion among the portions, as a function of the relevance indications;

upon detecting selection of a relevant portion, updating the relevance indication associated with relevant portions different than the selected relevant portions, as a function of the selected relevant portions; and constructing a region of interest based on the selected relevant portions.

The second aspect of the present invention has optional features and advantages similar to the first above-mentioned aspect.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Other features and advantages of the invention will become apparent from the following description of non-limiting exemplary embodiments, with reference to the appended drawings, in which.

DETAILED DESCRIPTION OF EMBODIMENTS OF THE INVENTION

According to embodiments, images captured by a camera are analysed in view of tasks to be performed so as to identify targets and associated characteristics and to select portions of the images or to suggest portions of the images that can be selected by a user, to construct a region of interest. Further to the selection of a portion of an image, the other suggested portions of the images are re-evaluated to update their relevance to belong to the region of interest in view of the previous selection.

Figure 1:
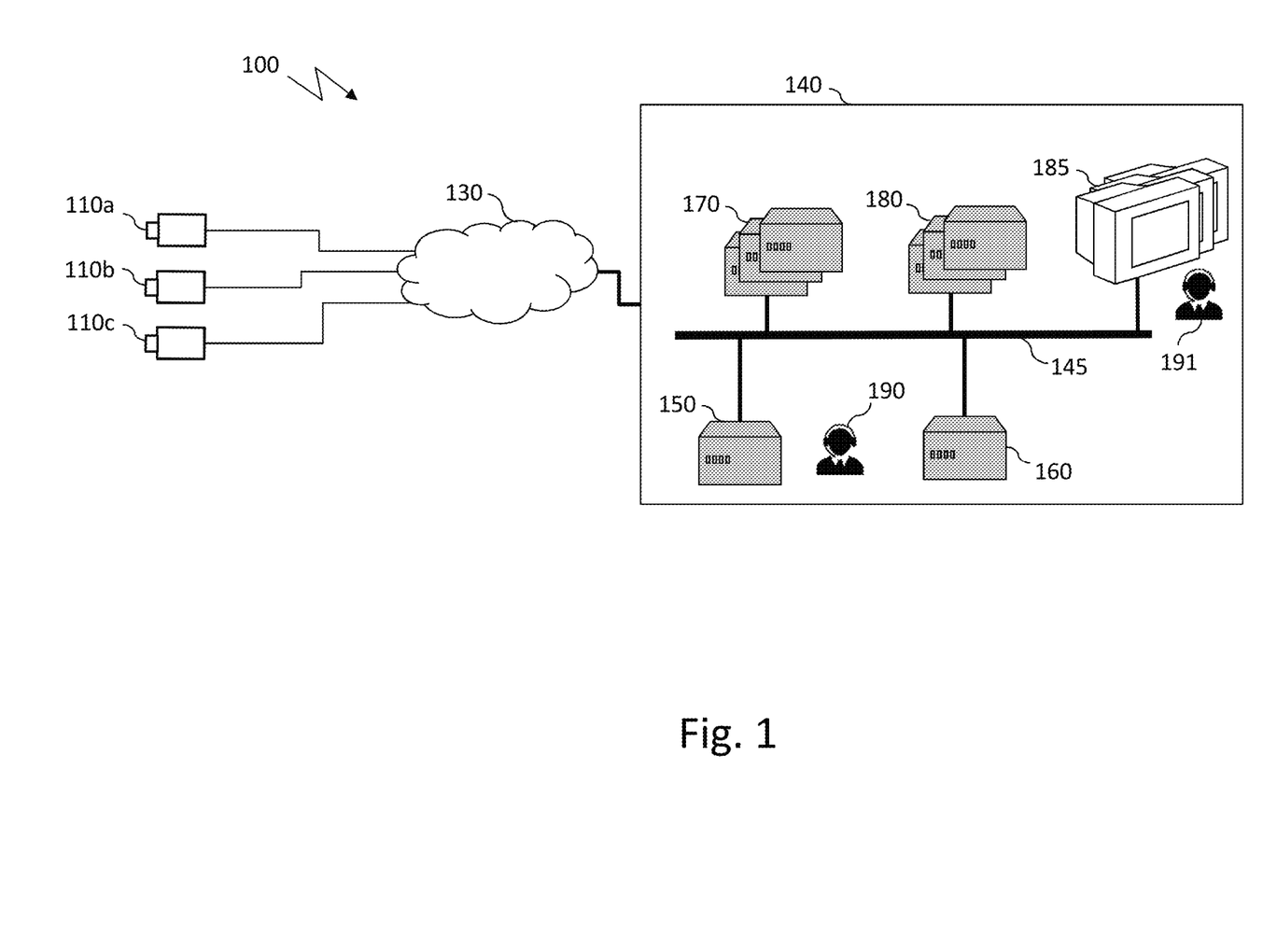
FIG. 1 schematically illustrates an example of a video surveillance system wherein embodiments of the invention may be implemented.

FIG. 1 schematically illustrates an example of a video surveillance system wherein embodiments of the invention may be implemented.

Video surveillance system 100 includes a plurality of network cameras denoted 110a, 110b, and 110c, for example network cameras of the Internet Protocol (IP) type, generically referred to as IP cameras 110.

Network cameras 110, also referred to as source devices, are connected to a central site 140 via a backbone network 130. In a large video surveillance system, backbone network 130 is typically a wide area network (WAN) such as the Internet.

According to the illustrated example, central site 140 comprises a video manager system (VMS) 150 used to manage the video surveillance system, an auto-setting server 160 used to perform an automatic setting of cameras 110, and a set of recording servers 170 configured to store the received video streams, a set of video content analytics (VCA) servers 180 configured to analyse the received video streams, and a set of displays 185 configured to display received video streams. All the modules are interconnected via a dedicated infrastructure network 145 that is typically a local area network (LAN), for example a local area network based on Gigabit Ethernet.

Video manager system 150 may be a device containing a software module that makes it possible to configure, control, and manage the video surveillance system, for example via an administration interface. Such tasks are typically carried out by an administrator (e.g. administrator 190) who is in charge of configuring the overall video surveillance system. In particular, administrator 190 may use video manager system 150 to select a source encoder configuration for each source device of the video surveillance system. In the state of the art, it is the only means to configure the source video encoders.

The set of displays 185 may be used by operators (e.g. operators 191) to watch the video streams corresponding to the scenes shot by the cameras of the video surveillance system.

The auto-setting server 160 contains a module for setting automatically or almost automatically parameters of cameras 110.

Administrator 190 may use the administration interface of video manager system 150 to define a region of interest to be used for processing images obtained from a camera and/or to set parameters of a camera.

Figure 2:
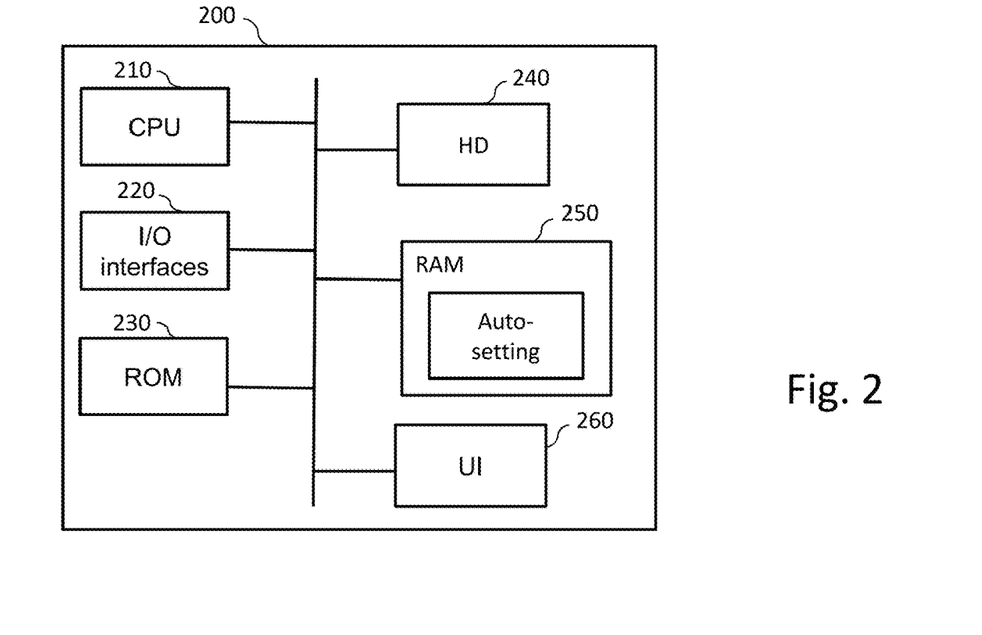
FIG. 2 is a schematic block diagram of a computing device for implementing embodiments of the invention.

FIG. 2 is a schematic block diagram of a computing device for implementing embodiments of the invention. It may be embedded in video manager system 150 described with reference to FIG. 1.

The computing device 200 comprises a communication bus connected to:
- a central processing unit 210, such as a microprocessor, denoted CPU;
- an I/O module 220 for receiving data from and sending data to external devices. In particular, it may be used to retrieve images from source devices;
- a read only memory 230, denoted ROM, for storing computer programs for implementing embodiments;
- a hard disk 240 denoted HD;
- a random access memory 250, denoted RAM, for storing the executable code of the method of embodiments of the invention, in particular a module making it possible to construct a region of interest, as well as registers adapted to record variables and parameters;
- a user interface 260, denoted UI, used to configure input parameters of embodiments of the invention. In particular, user interface 260 makes it possible for a user to construct a region of interest as described by reference to FIGS. 3 to 7. As mentioned above, an administration user interface may be used by an administrator of the video surveillance system.

The executable code may be stored either in random access memory 250, in hard disk 240, or in a removable digital medium (not represented) such as a disk of a memory card.

The central processing unit 210 is adapted to control and direct the execution of the instructions or portions of software code of the program or programs according to embodiments of the invention, which instructions are stored in one of the aforementioned storage means. After powering on, CPU 210 may execute instructions from main RAM memory 250 relating to a software application after those instructions have been loaded, for example, from the program ROM 230 or hard disk 240.

Figure 3:
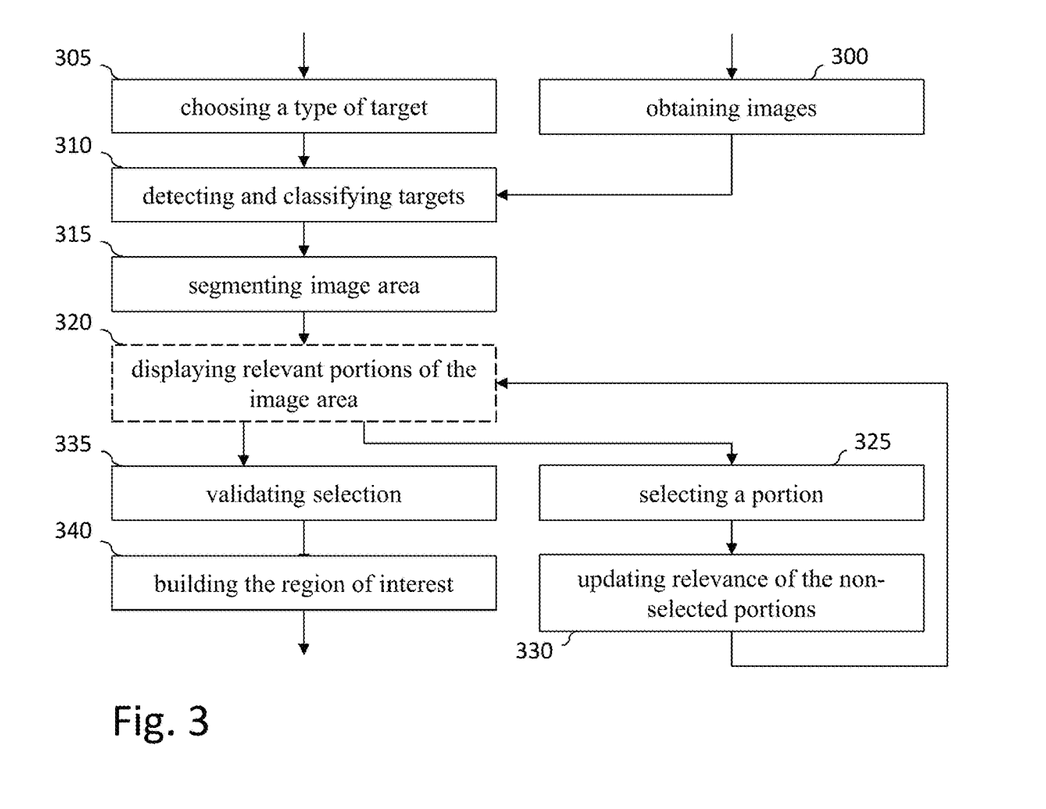
FIG. 3 is a block diagram illustrating an example of steps for identifying and selecting portions of images to be used for constructing a region of interest.

FIG. 3 is a block diagram illustrating an example of steps for identifying and selecting portions of images to be used for constructing a region of interest.

As illustrated, a first step aims at obtaining images from which a region of interest is to be determined (step 300). These images may have been previously stored, for example during a previous usage of the camera, or during a calibration phase of a video surveillance system to which belongs the camera from which the images have been obtained, or may be obtained directly from a camera.

In parallel, before, or after obtaining these images, one or several types of target are selected (step 305). For the sake of illustration, it is considered here that only one type of target is selected however, it is to be understood that the invention can be carried out with more than one type of target.

This step is typically carried out by a user in view of her/his needs, for example in view of the objective of the video surveillance system to which belongs a camera for which a region of interest is to be defined. Alternatively, it can be done automatically or partially automatically by target identification in the images, for example by using preconfigured standard video content analytics (VCA) modules. In such a case, a user may confirm the type of target to be selected or select a type of target among a plurality of identified types of target.

Next, all or some of the images are analysed so as to identify and classify the targets in view of the selected type of target (step 310). This step may be performed by using a standard video content analytics module. For example, the position, size, distance, pose, and/or speed of the identified targets may be obtained as a result of this step. These features may be used to classify the targets.

The choice of the video content analytics module to be used for image analysis depends on the task assigned to the considered camera, that may be chosen by the user. This video content analytics module should be adapted to carry out this task, preferably as efficiently as possible. For the sake of illustration, assuming that the considered camera aims at monitoring a given area to identify persons who enter and exit the so-defined zone, a face recognition video content analytics module may be adapted to analyse the images in order to identify and classify the targets for defining a region of interest. However, assuming that the considered camera aims at monitoring cars that enter this zone, a license plate recognition video content analytics module would be more appropriate than the face recognition video content analytics module.

It is noted that the video content analytics module used for the analysis does not need to be a real-time module or a resource-savvy module since it should not be used during normal operation of the video-surveillance system (for the purpose of analysing images in view defining a region of interest). Therefore, sophisticated and efficient video content analytics modules such as high-resource consuming deep learning-based algorithms may be used during image analysis. The chosen video content analytics modules are preferably able to localize targets, in both position and size, and to provide a detection score associated with each detected target. These outputs may be provided as a basis for the next steps.

Next, the area of the images is segmented according to several criteria (step 315) that can comprise, for example, one or several of the following:
- density of the targets;
- size and/or pose of the targets;
- distance of the targets;
- local image characteristics (such as brightness, from the identified target standpoint); and
- resource consumption and storage (based on motion detection in a corresponding portion).

These criteria make it possible to segment the area of the images to highlight the portions of this area that may be of interest in view of the selected type of target. All of these criteria may be used or only some of them depending on predetermined settings and/or user's choice. Each of these criteria may also be weighted.

While segmenting the image area, a relevance indicator is preferably associated with each of the segmented portions.

According to embodiments, the relevance indicator may be calculated as a function of a score provided by the video content analytics module used during the images analysis step (each video content analytics module generally calculates a score for each detected target). The relevance indicator of an area may be the mean score, the median score, or any derivative of the score of the video content analytics module, of all or some of the targets detected in the considered area during the analysis step.

According to other embodiments, the relevance indicator may be calculated as a function of the values of the variables that have been used for segmentation. The function to be used may depend on the task to be carried out by the considered camera. For example, the relevance indicator associated with a segmented portion, for a person monitoring task, may depend on the size, the pose, and the distance of the targets in the area corresponding to segmented portion, as well as the local contrast in the images.

According to embodiments, the relevance indicator may be modified by taking into account the resource, so as to add a penalty depending on the level of resource consumption.

According to embodiments, the relevance indicator may take a limited number of values. If the relevance indicators are displayed, for example to help a user to define a region of interest, each of these values can be represented with a particular colour so that a user could identify simply and efficiently different relevant portions of the images (step 320). There exist other solutions for indicating the relevance of a portion, for example by displaying the relevance indicator itself.

To that end, all the portions may be classified into a predetermined number of classes, for example four classes corresponding to not relevant portions, not so relevant portions, relevant portions, and highly relevant portions.

When a region of interest is defined by a user, depending on a choice of a user and/or settings of the interface used for constructing the region of interest, all the segmented portions, all the possibly relevant segmented portions, or all the relevant portions, are identified on an image, for example by using semi-transparent colours, making it possible to view the features of the image and the relevance of the segmented portions. For example, the highly relevant portions may be highlighted in green, the relevant portions may be highlighted in blue, and the not so relevant portions may be highlighted in red, the portions considered as not relevant being not highlighted.

Other information may be displayed when giving the opportunity to a user to select portions for constructing a region of interest. Such information may comprise an estimation of the amount of storage needed for storing images identified on the basis of selected portions (i.e. image selected as a function of motion detected in the selected portions), contextual messages (e.g. to inform a user on the relevance of the displayed portions, i.e. why a portion is relevant or not, or to give an indication on why the amount of needed storage is large, etc.), and/or resource contribution needed for processing each of the displayed portions (this can be displayed, for example, as a map of resource contribution for each of the portions).

According to embodiments, each segmented portion identified on the displayed image is user selectable. For example, selecting a portion may be done by a simple mouse click on the corresponding portion.

When a portion to be used as a part of a region of interest is selected (step 325), by a user or automatically, the relevance of the other segmented portions that have not been selected is updated (step 330).

For the sake of illustration, when a portion of an image associated with the foreground of the scene represented by the image is selected, that is to say when a portion of an image representing targets located very close to the camera is selected, the relevance associated with the portions of the images representing targets located very far from the camera should be decreased, since it would be difficult to set the camera focus appropriately.

Likewise, when a bright portion of an image or a dark portion of an image is selected, the relevance associated with the dark portions of the image or with the bright portions of the image, respectively, should be decreased, since it would be difficult to set the camera gain, aperture and, shutter speed appropriately.

Still for the sake of illustration, updating the relevance of the displayed portions may be based on predetermined rules such as the following:
- dark portions are not compatible with bright portions (due to camera settings);
- portions representing close objects of the actual scene are not compatible with portions representing far objects (due to depth of field); and
- dark portions are not compatible with portions associated with fast moving targets and portions representing close or far targets (due to contradictory camera settings).

Other rules may be defined depending on the mission to be conducted and on features of the actual scene.

The displayed portions are updated accordingly (step 320), for example the colour associated with each relevant portion is updated accordingly.

Once the selected portion(s) are validated (step 335), by a user or automatically, the region of interest is constructed from the selected portion(s) (step 340), for example by concatenating the selected portions.

The region of interest may then be used on a standard basis, for example to select images to store based on the motion in this region, or to analyse images in order to set the used camera or to track targets, or to trigger some alarm, or any other use of a region of interest.

Figure 4:
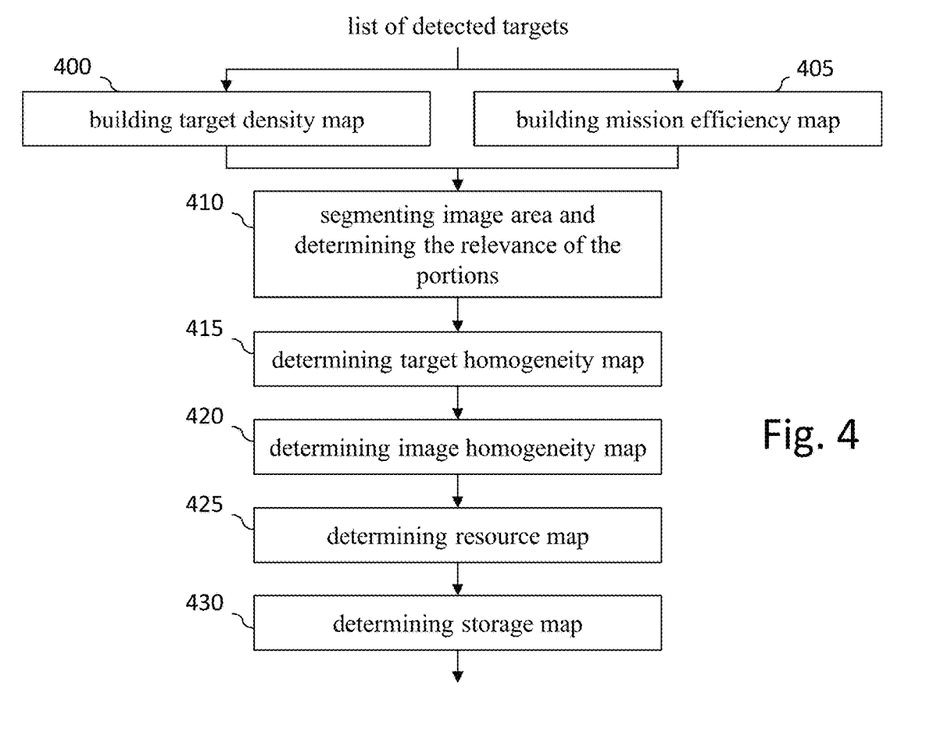
FIG. 4 is a block diagram illustrating an example of steps for segmenting an image area in view of a given mission and for making it possible to select portions of images to construct a region of interest or to guide a user for selecting portions of images to construct a region of interest.

FIG. 4 is a block diagram illustrating an example of steps for segmenting an image area in view of a given mission and for making it possible to select portions of images to construct a region of interest or to guide a user for selecting portions of images to construct a region of interest. It can be carried out from the image area (i.e. the width and length of the images), from the list of detected targets comprising, for example, the position, size, pose, and distance to the camera of the detected targets as well as the classes to which they belong if they are classified, and from information relative to the mission to be carried out, for example from information regarding the size and pose of targets if the mission is directed to plate or face recognition.

According to a first step, a target density map is built from the positions of the detected targets (step 400). According to embodiments, this can be done by using normalized density values varying, for example, from 0 to 1000 and by using predetermined thresholds the number of which depending on the number of portions of images to be generated. For the sake of illustration, three thresholds ($\theta_1$, $\theta_2$, $\theta_3$) may be used to identify portions of image where almost no targets have been detected ($d<\theta_1$), portions of image where few targets have been detected ($\theta_1 \leq d < \theta_2$), portions of image where many targets have been detected ($\theta_2 \leq d < \theta_3$), and portions of image where a huge number of targets have been detected ($\theta_3 \leq d$). Still for the sake of illustration, thresholds $\theta_1$, $\theta_2$, and $\theta_3$ may be set to 50, 125, and 200, respectively.

As a result, the target density map may be represented as a set of image portions wherein each portion is associated with a given range of target density values, representing four different levels of the relevance of the corresponding portions.

In parallel, before, or after determining the target density map, a mission efficiency map is built (step 405). Still according to particular embodiments, it may be based on information associated with detected targets such as their size and pose and on information relative to the mission to be carried out, for example by computing a mean mission efficiency values for each detected target by comparing characteristics associated with the considered detected target and corresponding values associated with the mission to be carried out. These efficiency values may then be compared with thresholds to identify portions of images.

Again, the mission efficiency map may be represented as a set of image portions wherein each portion is associated with a given range of mission efficiency values, representing a predetermined number of different levels of the relevance of the corresponding portions, for example four levels.

Next, the image area is segmented in view of the built target density map and of the mission efficiency map (step 410). For example, for each location of the image area, the relevance of the location to belong to a region of interest is determined as a function of the corresponding level of relevance as defined in the target density map and as defined in the mission efficiency map, according to predetermined rules. Accordingly, a location is considered as very relevant if it corresponds to a location that is very relevant in the target density map and in the mission efficiency map, as not relevant if it corresponds to a location that is not relevant in the target density map and not relevant in the mission efficiency map, and so on.

It is to be noted that the segmentation of the image area from the target density map and the mission efficiency map may be based on other rules and/or functions.

Next, a target homogeneity map may be built (step 415). According to particular embodiments, it is based on the segmented image area where a target homogeneity value is associated with each of the portions, a same value associated with different portions indicating that these portions may be selected together for constructing a region of interest.

For the sake of illustration, such a target homogeneity value may characterize a distance value or a range of distance values of the targets to the camera. The target homogeneity map may be used for updating the relevance of the non-selected portions after a user selects a portion, as described with reference 330 in FIG. 3.

Next, an image homogeneity map may be built (step 420). According to particular embodiments, it is based on the segmented image area where an image homogeneity value is associated with each of the portions, a same value associated with different portions indicating that these portions may be selected together for constructing a region of interest.

For the sake of illustration, such an image homogeneity value may characterize a level of brightness of the image part corresponding to the considered portion. Again, the image homogeneity map may be used for updating the relevance of the non-selected portions after a user selects a portion, as described with reference 330 in FIG. 3.

Next, a resource map may be built (step 425). According to particular embodiments, it is based on the segmented image area where a resource value is associated with each of the portions. Such a resource value may characterize a level of resource, for example of VCA resources, needed for processing the corresponding portion. The resource map may be used for displaying information associated with the portions for guiding the choice of a user when selecting portions, as described with references 320 and 325 in FIG. 3.

Next, a storage map may be built (step 430). According to particular embodiments, it is based on the segmented image area where a storage value is associated with each of the portions. Such a resource value may characterize an amount of storage memory needed for storing images for a predetermined time period, for example 30 days, if the corresponding portion is selected. The storage map may be used for displaying information associated with the portions for guiding the choice of a user when selecting portions, as described with references 320 and 325 in FIG. 3.

It is to be noted that the order for executing steps 415 to 430 is not relevant. Accordingly, they can be executed in one order or in another.

Figure 5:
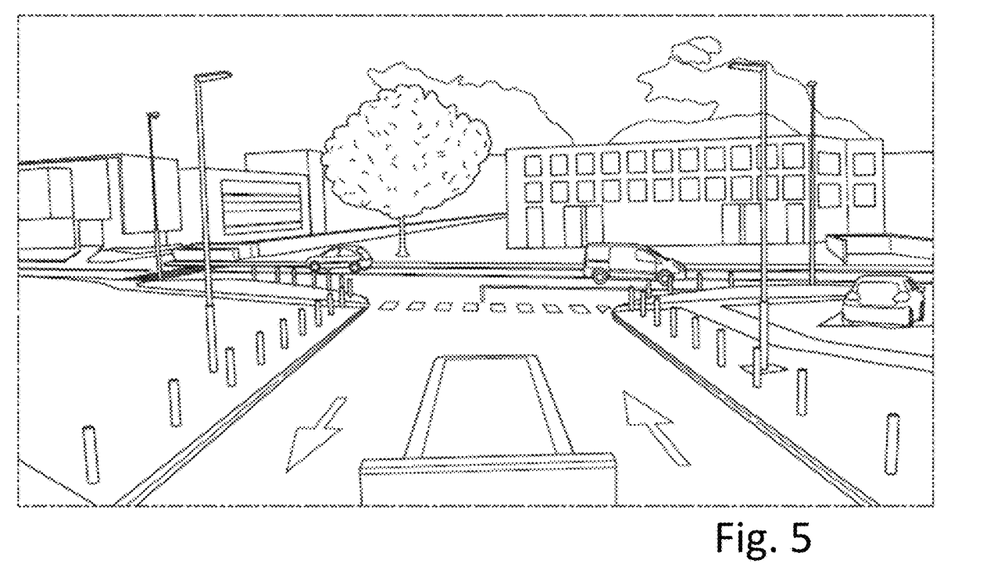
FIG. 5 is a view of an entrance gate of a business area comprising buildings and streets that may be observed from a camera of a surveillance system, wherein a region of interest may be defined to optimize processing of the corresponding images.

FIG. 5 is a view of an entrance gate of a business area comprising buildings and streets that may be observed from a camera of a surveillance system, wherein a region of interest may be defined to optimize processing of the corresponding images. As illustrated, the images obtained from this camera comprise representations of moving objects such as cars, trees, and clouds.

Analysing the image of FIG. 5 as well as similar images obtained from the same camera makes it possible to determine portions of the images that are of interest for processing these images, depending on their use. For example, for a car license plate recognition application, the portions of the images corresponding to the sky or to the buildings are meaningless.

FIGS. 6a to 6d illustrate a first example of an embodiment of the invention for constructing a region of interest from images like the one illustrated in FIG. 5 for the aim of car monitoring.

Figure 6A:
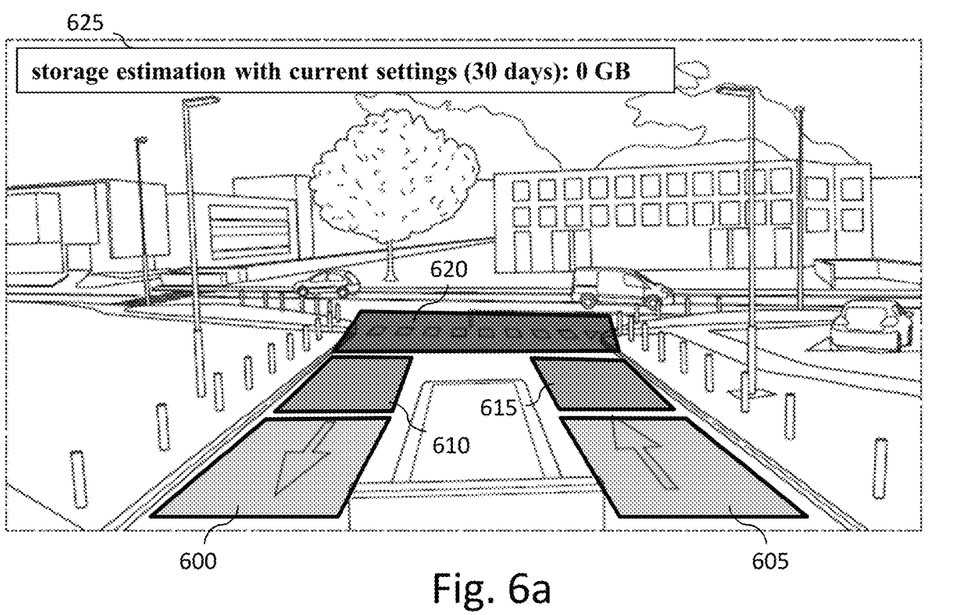
FIGS. 6a to 6d illustrate a first example of an embodiment of the invention for constructing a region of interest from images like the one illustrated in FIG. 5 for the aim of car monitoring.

After choosing cars as targets and analysing images like the one illustrated in FIG. 5, for example using the steps described by reference to FIG. 4, five portions of the image area are identified as possible locations for cars, denoted 600 to 620, as illustrated in FIG. 6a.

According to this example, a main parameter for computing the relevance of the portions is the size (and the pose) of the detected targets.

In the other portions of the image area, the targets have not been detected or, when they have been detected, the corresponding portions are not relevant in view of the main criteria.

For the sake of illustration, it is considered that portions 600 and 605 are very relevant since they make it possible to recognize a huge number of license plates with a high degree of reliability (due to the large size of the license plate representations in the images), that portions 610 and 615 make it possible to recognize quite efficiently license plates, and that portion 620 makes it possible to recognize only few license plates (due to the small size of the license plate representations in the images). According to embodiments, portions 600 and 605 may be represented in green, portions 610 and 615 in blue, and portion 620 in red.

Since none of these portions has been selected, the amount of storage required to store images based on motion detected in a region of interest formed from selected portions is zero, as illustrated with message 625.

Figure 6B:
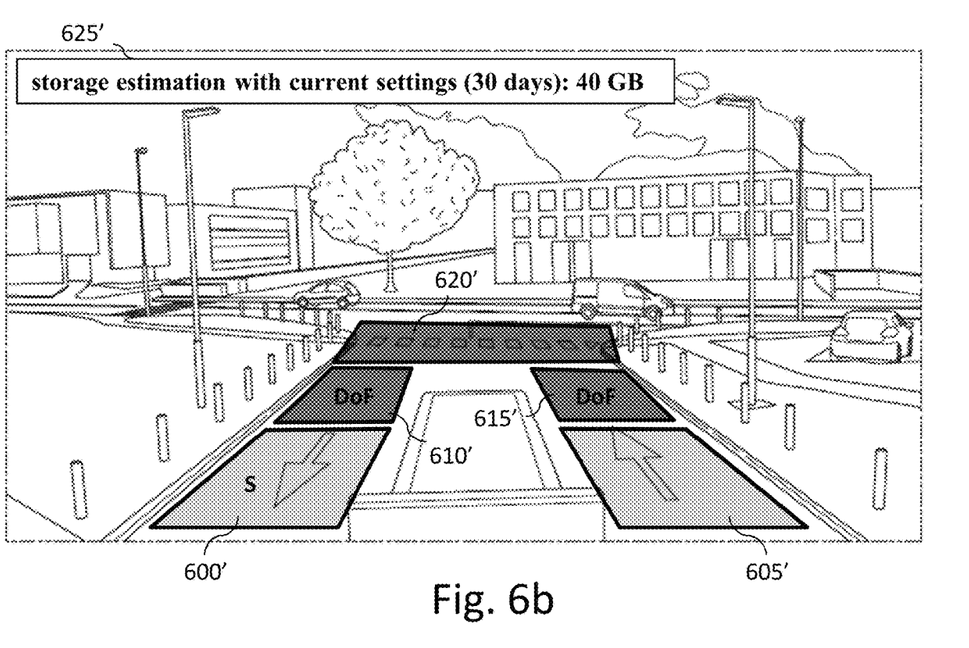

As illustrated in FIG. 6b, after a user selects portion 600 (as represented with 'S' in portion 600' in FIG. 6b), that could be used to adapt camera settings accordingly, the relevance of portions 610 and 615 is decreased since the camera focus set for targets located in the area represented in portion 600 will make it difficult to obtain a sharp license plate representation in portions 610 and 615 due the bad depth of field (denoted DoF in portions 610' and 615' in FIG. 6b). In this case, the relevance value of portions 610 and 615 is the same as the one of portion 620 after portion 600 has been selected. Its colour may be changed from blue to red.

As illustrated with message 625', selection of portion 600 requires 40 gigabytes (GB) to store images for 30 days when motion is detected in this selected portion.

Figure 6C:
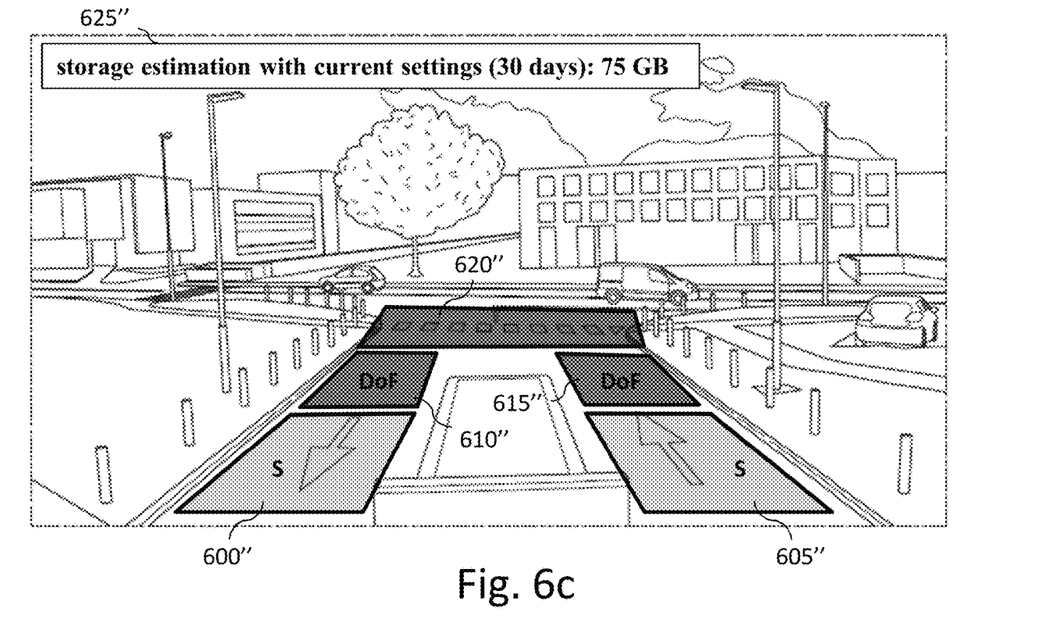

Selection of portion 605' does not change the relevance of the non-selected portions, as illustrated in FIG. 6c, since, in particular, it does not affect the camera focus. However, selecting this portion increases the amount of storage needed for storing images for 30 days when motion is detected in the selected portions, as illustrated with message 625" in FIG. 6c.

Figure 6D:
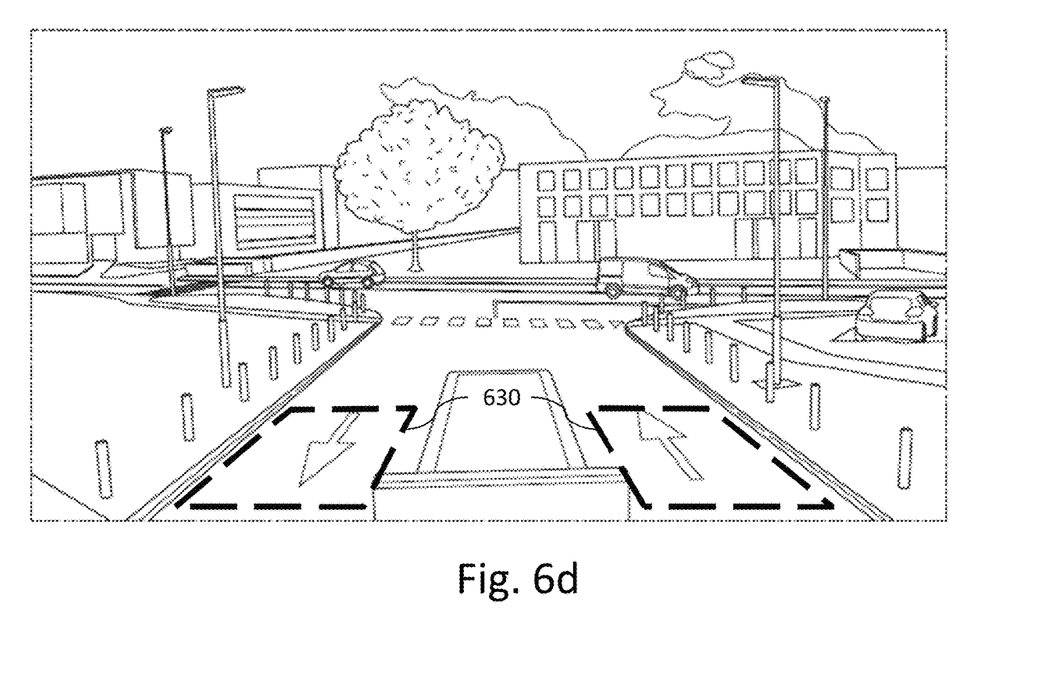

After validation of the selected portions, the latter are used to construct a region of interest, as illustrated in FIG. 6d with reference 630. The constructed region of interest may then be used to process images, in particular new images, and/or to improve the settings of the camera used to obtain the images.

FIGS. 7a to 7d illustrate a second example of an embodiment of the invention for constructing a region of interest from images like the one illustrated in FIG. 5 for the aim of car monitoring.

Figure 7A:
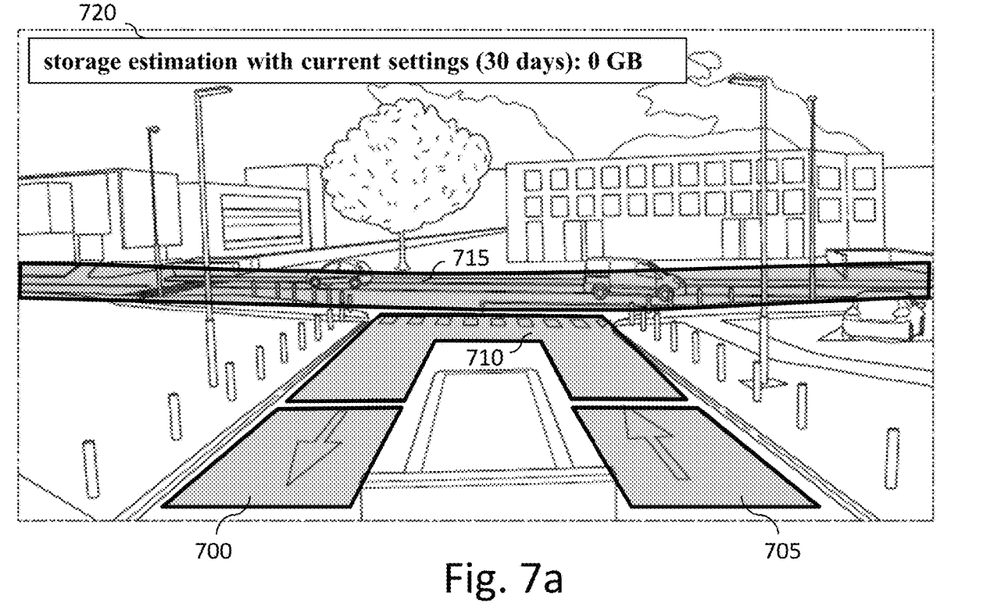
FIGS. 7a to 7d illustrate a first example of an embodiment of the invention for constructing a region of interest from images like the one illustrated in FIG. 5 for the aim of car monitoring.

Again, after choosing cars as targets and analysing images like the one illustrated in FIG. 5, for example using the steps described by reference to FIG. 4, four portions of the image area are identified as possible locations for cars, denoted 700 to 715, as illustrated in FIG. 7a.

According to this example, main parameters for computing the relevance of the portions is detected target density and the movement speed of the targets.

In the other portions of the image area, the targets have not been detected or, when they have been detected, the corresponding portions are not relevant in view of the main criteria.

All portions 700 to 715 are considered as very relevant since,
portions 700 to 710 correspond to low detected target density but to slow target movements and
portion 715 corresponds to fast target movements but to a high detected target density.

Therefore, according to embodiments, portions 700 to 715 may be represented in green.

Since none of these portions has been selected, the amount of storage required to store images based on motion detected in a region of interest formed from selected portions is zero as illustrated with message 720.

Figure 7B:
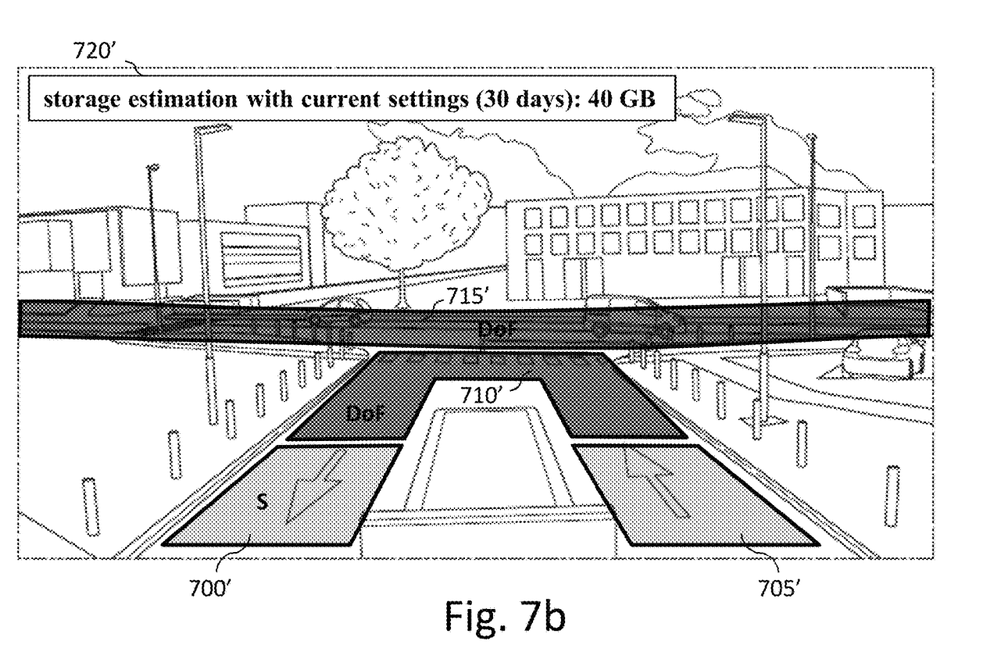

As illustrated in FIG. 7b, after a user selects portion 700 (as represented with 'S' in portion 700' in FIG. 7b), that may be used to adapt camera settings accordingly, relevance of portions 710 and 715 is decreased since the camera focus set for targets located in the area represented in portion 700 will make it difficult to obtain sharp cars representations in portions 710 and 715 due the bad depth of field (denoted DoF in portions 710' and 715' in FIG. 7b).

According to embodiments, portions 710 and 715 may be represented in red.

As illustrated with message 720', selection of portion 700 requires 40 gigabytes (GB) to store images for 30 days when motion is detected in this selected portion.

Figure 7C:
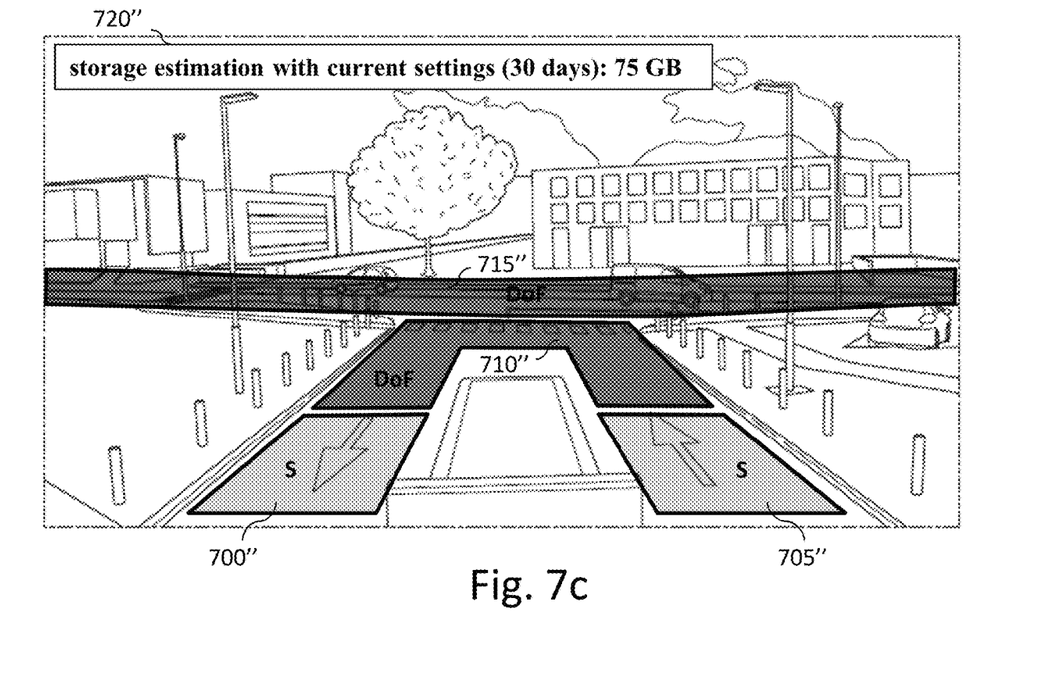

Selection of portion 705' does not change the relevance of the non-selected portions, as illustrated in FIG. 7c, since, in particular, it does not affect the camera focus. However, selecting this portion increases the amount of storage needed for storing images for 30 days when motion is detected in the selected portions, as illustrated with message 720" in FIG. 7c.

Figure 7D:
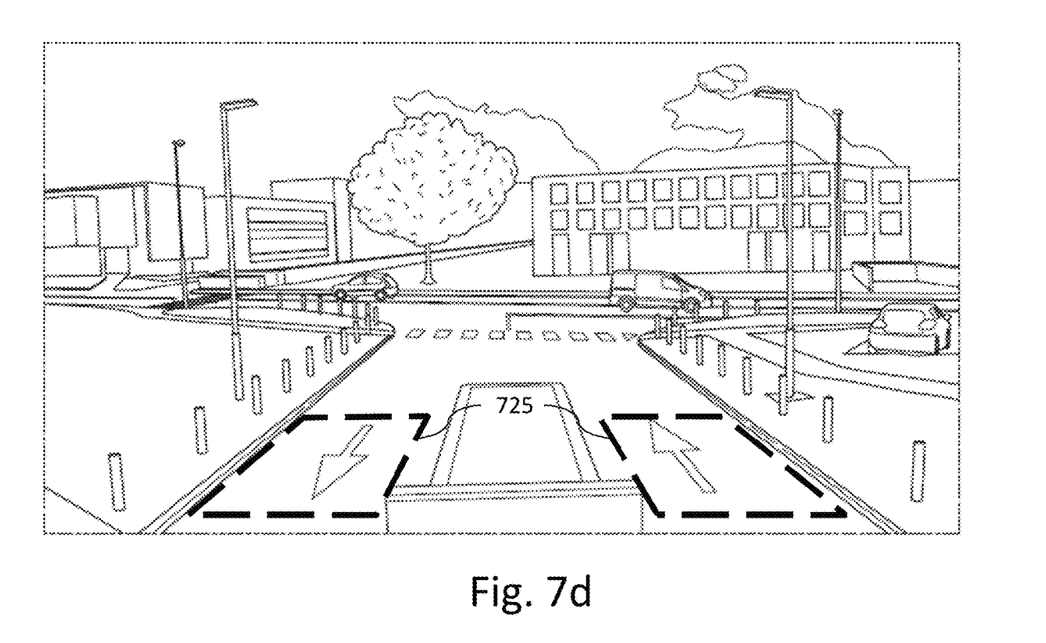

After validation of the selected portions, the latter are used to construct a region of interest, as illustrated in FIG. 7d with reference 725. Again, the constructed region of interest may then be used to process images, in particular new images, and/or to improve the settings of the camera used to obtain the images.

According to embodiments, a region of interest may be determined automatically. For example, once the user has selected the task assigned to a camera, the relevance indicator of each area, and the subsequent updated relevance indicators resulting from selection of image portion(s), may be used as a criteria to automatically select the most relevant set of image portions. For example, all the image portions that are associated with a relevance indicator (or an updated relevance indicator) above a threshold characterizing relevant image portions, for example a predetermined threshold, may be automatically selected.

According to embodiments, such an automatic selection may be proposed as a starting point for a subsequent user selection, as a way to accelerate construction of a region of interest.

According to other embodiments, this automatic selection may be used directly to define a region of interest, without interaction with a user, and without the need for a user interface, except for the initial choice of the task assigned to the considered camera.

While the invention has been illustrated and described in detail in the drawings and foregoing description, such illustration and description are to be considered illustrative or exemplary and not restrictive, the invention being not restricted to the disclosed embodiment. Other variations on the disclosed embodiment can be understood and performed by those skilled in the art, in carrying out the claimed invention, from a study of the drawings, the disclosure and the appended claims.

Such variations may derive, in particular, from combining embodiments as set forth in the summary of the invention and/or in the appended claims.

In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

The invention claimed is:

1. A method for constructing a region of interest from images representing a same scene, the region of interest being used for setting the camera used to obtain the images and/or to process images obtained from the camera, the method comprising:
obtaining a plurality of images representing a same scene;
detecting predetermined targets in images of the plurality of images;
in response to detecting predetermined targets, segmenting an area corresponding to the images of the plurality of images into portions of image by using at least one predetermined criteria, each of the portions being associated with a relevance indication for the corresponding portion to be selected as part of a region of interest, said relevance indication scoring the portion relative to the detected predetermined targets;
selecting at least one relevant portion among the portions, as a function of the relevance indications;
updating the relevance indication associated with the portions different than the at least one selected relevant portion, according to a predetermined non-compatibility rule with the at least one selected relevant portion; and
constructing a region of interest based on the selected relevant portions,
wherein the non-compatibility rule defines the compatibility between portions for luminance and/or target characteristics.

2. The method of claim 1, further comprising a step of processing an image as a function of the constructed region of interest and/or a step of setting the camera as a function of the constructed region of interest.

3. The method of claim 1, wherein the step of selecting at least one relevant portion comprises a step of displaying a representation of relevant portions and of corresponding relevance indications and a step of detecting selection of at least one relevant portion by a user.

4. The method of claim 1, wherein the step of selecting at least one relevant portion is carried out automatically as a function of at least one value obtained during the step of determining predetermined targets.

5. The method of claim 1, further comprising a step of choosing the predetermined targets.

6. The method of claim 1, wherein the step of segmenting comprises a step of building a target density map and/or a step of building a mission efficiency map.

7. The method of claim 1, wherein the step of updating comprises a step of obtaining an indication of homogeneity of relevant portions.

8. The method of claim 7, wherein the indication of homogeneity is determined as a function of target distances to the camera and/or as a function of image characteristics of the corresponding relevant portions.

9. The method of claim 3, further comprising a step of displaying additional information representing a consequence of selecting a displayed relevant portion.

10. A non-transitory computer-readable storage medium storing instructions of a computer program for implementing the method according to claim 1.

11. A device for constructing a region of interest from images representing a same scene, the region of interest being used for setting the camera used to obtain the images and/or to process images obtained from the camera, the device comprising a microprocessor configured for carrying out the steps of:
   obtaining a plurality of images representing a same scene;
   detecting predetermined targets in images of the plurality of images;
   in response to detecting predetermined targets, segmenting an area corresponding to the images of the plurality of images into portions of image by using at least one predetermined criteria, each of the portions being associated with a relevance indication for the corresponding portion to be selected as part of a region of interest, said relevance indication scoring the portion relative to the detected predetermined targets;
   selecting at least one relevant portion among the portions, as a function of the relevance indications;
   updating the relevance indication associated with the portions different than the at least one selected relevant portion, according to a predetermined non-compatibility rule with the at least one selected relevant portion; and
   constructing a region of interest based on the selected relevant portions,
   wherein the non-compatibility rule defines the compatibility between portions for luminance and/or target characteristics.

12. The device of claim 11, wherein the processor is further configured for carrying out a step of processing an image as a function of the constructed region of interest and/or a step of setting the camera as a function of the constructed region of interest.

13. The device of claim 11, wherein the processor is further configured so that selecting at least one relevant portion comprises displaying a representation of relevant portions and of corresponding relevance indications and detecting selection of at least one relevant portion by a user.

14. The device of claim 11, wherein the processor is further configured so that selecting at least one relevant portion is carried out automatically as a function of at least one value obtained during determining predetermined targets.

15. The device of claim 11, wherein the processor is further configured for carrying out a step of choosing the predetermined targets.

16. The device of claim 11, wherein the processor is further configured so that the step of segmenting comprises a step of building a target density map and/or of building a mission efficiency map.

17. The device of claim 11, wherein the processor is further configured so that the step of updating comprises a step of obtaining an indication of homogeneity of relevant portions.

18. The device of claim 17, wherein the processor is further configured so that the indication of homogeneity is determined as a function of target distances to the camera and/or as a function of image characteristics of the corresponding relevant portions.

19. The device of claim 13, wherein the processor is further configured for carrying out a step of displaying additional information representing a consequence of selecting a displayed relevant portion.

* * * * *